United States Patent [19]
Atkinson et al.

[11] Patent Number: 5,796,400
[45] Date of Patent: Aug. 18, 1998

[54] VOLUME-BASED FREE FORM DEFORMATION WEIGHTING

[75] Inventors: James R. Atkinson, Santa Barbara; Barbara M. Balents, Goleta, both of Calif.

[73] Assignee: Silicon Graphics, Incorporated, Mountain View, Calif.

[21] Appl. No.: 511,660

[22] Filed: Aug. 7, 1995

[51] Int. Cl.$^6$ ................................................. G06T 17/40
[52] U.S. Cl. .......................... 345/420; 345/433; 345/441
[58] Field of Search .................. 345/418–20, 440–43, 345/433–38, 445–443; 364/468.03, 468.04, 468.08, 468.09, 468.1, 578

[56] References Cited

U.S. PATENT DOCUMENTS

| | | | |
|---|---|---|---|
| 4,821,214 | 4/1989 | Sederberg | 364/522 |
| 5,121,334 | 6/1992 | Riley et al. | 345/419 |
| 5,412,770 | 5/1995 | Yamashita et al. | 345/442 |
| 5,619,625 | 4/1997 | Konno et al. | 354/419 |

OTHER PUBLICATIONS

Gourret, et al, "Modeling of Contact Deformations Between a Synthetic Human and Its Environment", *Computer Aided Design*, vol. 23, No. 7, pp. 514–520, Sep. 1991.

Wu, et al, "Deformable Surfaces using Physically Based Particles", *Computer Graphics: Developments in Virtual Environments*, Computer Graphics International, pp. 205–215, 1995.

Gourret, et al, "Simulation of Object and Human Skin Deformations in a Grasping Task", *Computer Graphics, Siggraph '89*, pp. 21–30, Aug. 1989.

Magnenat-Thalmann, et al, "Joint-Dependent Local Deformations for Hand Animation and Object Grasping", *Graphics Interface '88*, pp. 26–33, 1988.

Bardinet, Eric, et al, "Tracking Medical 3D Data with a Parametric Deformable Model", *Computer Vision, 1995 International Conference, IEEE*, Apr. 1995, pp. 299–302.

Adachi, Yoshitaka, et al, "Touc and Trace on the Free–Form Surface of a Virtual Object", *Virtual Reality, IEEE, 1993 Intenational Symposium*, 1993, pp. 162–168.

Iwata, Hiroo, "Pen–Based Haptic Virtual Environment", *Virtual Reality, IEEE 1993 International Symposium*, 1993, pp. 287–292.

Yamashita, Juli, et al, "A Direct Deformation Model", *Virtual Reality, IEEE, 1993 Intenational Symposium*, 1993, pp. 499–504.

Lizhuang, Ma, et al, "Advanced Curve and Surface Design in CAD System Using STEP", *TENCON '93, IEEE Region 10 Conference on Computer Communication*, 1993, pp. 581–583.

Lamousin, Henery J., et al, "NURBS–Based Free–Form Deformations", *IEEE Computer Graphics and Applications Magazine*, vol. 14, No. 6, Nov. 1994, pp. 59–65.

True, Thomas J., et al, "Volume Warping", *Visualization 1992 Conference, IEEE*, 1992, pp. 308–315.

Fujimoto, Hideo, et al, "Development of CAPP System for Removal Operation of 3D Free Surfaces", *Industrial Electronics, IEEE, 1992 International Symposium*, pp. 404–408.

Barr, A.H., "Superquadrics and Angle–Preserving Transformations," *IEEE Computer Graphics and Applications*, vol. 1, Jan. 1981, pp. 11–23.

(List continued on next page.)

*Primary Examiner*—Rudolph J. Buchel, Jr.
*Attorney, Agent, or Firm*—Sterne, Kessler, Goldstein, & Fox P.L.L.C.

[57] ABSTRACT

A system and method for weighting one or more vertices in a region being deformed by free-form deformation techniques assigns a weight a vertex based on the position of that vertex within the deformation lattice. The assigned weight is used to alter the amount of displacement that the free-form deformation would otherwise have on the vertex by an amount proportional to the weight.

27 Claims, 6 Drawing Sheets

OTHER PUBLICATIONS

Barr, A.H., "Global and Local Deformations of Solid Primitives," *Computer Graphics*, vol. 18, No. 3, Jul. 1984, pp. 21–30.

Bézier, P., "Mathematical and Practical Possibilities of Unisurf," *Computer Aided Geometric Design*, R.E. Barnhill and R.F. Riesenfield, eds., Academic Press, New York, 1974, pp. 124–152.

Blinn, J., "A Generalization of Algebraic Surface Drawing," *ACM Transactions on Graphics*, vol. 3, Jul. 1982, pp. 235–256.

Boehm et al., "A Survey of Curve and Surface Methods in CAGD," *Computer Aided Geometric Design*, vol. 1, No. 1, Jul. 1984, pp. 1–60.

Brewer et al., "Visual Interaction with Overhauser Curves and Surfaces," *Computer Graphics*, vol. 11, No. 2, Jul. 1977, pp. 132–137.

Casale et al., "An Overview of Analytic Solid Modeling," *IEEE Computer Graphics and Applications*, vol. 5, Feb. 1985, pp. 45–56.

Chiyokura et al., "Design of Solids with Free-Form Surfaces," *Computer Graphics*, vol. 17, No. 3, Jul. 1983, pp. 289–298.

Cobb, E.S., "Design of Sculptured Surfaces Using a B–Spline Representation," *Ph.D. Dissertation*, Department of Computer Science, University of Utah, Jun. 1984.

Farouki et al., "A Hierarchy of Geometric Forms," *IEEE Computer Graphics and Applications*, vol. 5, May 1985, pp. 51–78.

Hoffman et al., "Automatic Surface Generation in Computer Aided Design," TR 85–661, Dept. of Computer Science, Cornell University, Jan. 1985.

Jared et al., "Synthesis of Volume Modelling and Sculptured Surfaces in Build," *CAD Computers in Design Engineering Conference Proceedings*, 1984, pp. 481–495.

Kalay, Y.E., "Modeling Polyhedral Solids Bounded by Multi-Curved Parametric Surfaces," *AMC IEEE Nineteenth Design Automation Conference Proceedings*, Jun. 1982, pp. 501–507.

Kimura, F., "Geomap–III: Designing Solids with Free-Form Surfaces," *IEEE Computer Graphics and Applications*, vol. 4, Jun. 1984, pp. 58–72.

Middleditch et al., "Blend Surfaces for Set Theoretic Volume Modelling Systems," *Computer Graphics*, vol. 19, No. 3, Jul. 1985, pp. 161–170.

Owen, J. et al., "Intersection of General Implicit Surfaces," *Geometric Modeling, Algorithms and New Trends*, G. Farin ed., SIAM, 1987, pp. 335–345.

Parent, R.E., "A System for Sculpturing 3-D Data," *Computer Graphics*, vol. 11, No. 2, Jul. 1977, pp. 138–147.

Requicha et al., "Solid Modeling: A Historical Summary and Contemporary Assessment," *IEEE Computer Graphics and Applications*, vol. 2, No. 2, Mar. 1982, pp. 9–24.

Ricci, A., "A Constructive Geometry for Computer Graphics," *The Computer Journal*, vol. 16, No. 2, May. 1973, pp. 157–160.

Riesenfeld, R.F., "A View of Spline–Based Solid Modelling," *Proceedings of Autofac V*, Detroit, Michigan, Nov. 1983, pp. 75–83.

Rockwood et al., "Blending Surfaces in Solid Modeling," *Geometric Modeling: Algorithms and New Trends*, G. Farin ed., SIAM, 1986.

Sabin et al., "Interrogation Techniques for Parametric Surfaces," *Proceedings of Computer Graphics '70*, Brunel University, Apr. 1970.

Sarraga et al., "Free–Form Surfaces in GMSolid: Goals and Issues," *Solid Modeling by Computers From Theory to Applications*, M.S. Pickett and J.W. Boyse, editors, Plenum Press, 1984, pp. 187–209.

Sederberg et al., "Free–Form Deformation of Solid Geometric Models," *SIGGRAPH '86*, ACM, vol. 20, No. 4, 1986, pp. 151–160.

Stanton et al., "A Parametric Cubic Modeling System for General Solids of Composite Material," *International Journal of Numerical Methods in Engineering*, vol. 11, 1977, pp. 653–670.

Steinberg, H.A., "A Smooth Surface Based on Biquadratic Patches," *IEEE Computer Graphics and Applications*, vol. 4, Sep. 1984, pp. 20–23.

Thomas, S.W., "Modelling Volumes Bounded by B–Spline Surfaces," *Ph.D. Dissertation*, Department of Computer Science, University of Utah, 1984.

Varady et al., "Design Techniques for the Definition of Solid Objects with Free–Form Geometry," *Computer Aided Geometric Design*, vol. 1, No. 3, Dec. 1984, pp. 207–225.

Veenman, P.R., "The Design of Sculptured Surfaces Using Recursive Subdivision Techniques," *Proceedings of Conference on CAD/CAM Technology in Mechanical Engineering*, MIT, Cambridge, Mar. 1982.

VOLUME-BASED FREE FORM DEFORMATION WEIGHTING

RELATED APPLICATIONS

This application is related to a commonly owned application, filed on even date herewith, entitled "System and Method for Deforming Objects Using Delta Free-Form Deformation" and having Attorney Docket Number 1452.1540000, U.S. patent application Ser. No. 08/512,136, which is incorporated herein by reference.

BACKGROUND OF THE INVENTION

1. Field of the Invention

The present invention relates generally to computer graphics, and more specifically to a system and method for assigning a weight to one or more vertices of a modeled object.

2. Related Art

Computer generated graphics are continuing to play an increasing role in numerous applications including such disciplines as computer aided design and computer-generated animation. As more and more disciplines look to modeling of complex phenomena using computer graphics, a higher demand is placed on technology to produce high quality images.

As computer graphics are being used to model a wider variety of objects, significant challenges are posed. Modeling human form and motion, for example, presents particularly significant challenges. In some disciplines, a high demand is placed on realism of the generated image. High demands on the realism of the image also pose a significant challenge.

SUMMARY OF THE INVENTION

The present invention is directed toward a system and method for calculating a weight for one or more vertices of an object embedded within a region modified by free-form deformation. The calculated weight is based on the geometric location of the vertex within that deformation region. The invention further provides a system and method for using the calculated weight to control the amount of influence that free-form deformation has on that vertex. Volume-based free-form deformation weighting according to the invention is a technique of defining and storing the influence that a free-form deformation lattice has on vertices within that lattice.

Volume-based free-form deformation weighting allows a user of a graphics system to easily and intuitively control the region of influence during a free-form deformation.

The method of volume-based free-from deformation weighting is performed as follows. First, the position of a vertex within the deformation lattice is determined. Specifically, the position of a vertex is determined in terms of its local (S,T,U) position within the lattice. Next, a weight is assigned to the vertex based on its position determined. And finally the vertex is moved (or displaced) using free-form deformation or delta free-form deformation, but the displacement is adjusted by the weight assigned to that vertex.

For a vertex assigned a full weight, the vertex is translated the full amount specified by the free-form deformation. A vertex with a weighting of less than full moves by an amount that is specified by the free-form deformation, but only by an amount for the deformation that is proportional to the weight assigned.

One way to assign weights to vertices is to do so based on a radius values assigned to the vertices. In this embodiment, radius values are assigned to each vertex, based on the position of that vertex relative to one or more specified corner points. Once the radius values are determined, the weighting parameters for each of the one or more vertices are applied to the radius value of that vertex to obtain a weight.

One advantage of the invention is that it allows specification of arbitrarily shaped volumes of interest within a deformation lattice. Thus, users are not confined to working within a region of interest which is inherently parallelipiped shaped.

A further advantage of the invention is that weighting for the vertices is maintained volumetrically, so that it can be stored with a small amount of data. Further, weighting can be stored independently from the vertices so that the same weights can be re-used on multiple geometries.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overview and Discussion of the Invention

The present invention is directed toward a system and method for calculating a weight for one or more vertices of an object embedded within a free-form deformation or a delta free form deformation (DFFD). According to the invention, the calculated weight for each vertex is based on the geometric location of that vertex within a free-form deformation or delta free-form deformation lattice. Additional parameters can be specified to further define the weight for each vertex. The invention is further directed toward a system and method for using the weight of a vertex to control the amount of influence that a free-form or delta free-form deformation has on that vertex.

2. Free-Form Deformation

One method for using a computer graphics system for free-form deformation of geometric models is based on the use of a control-point grid. According to this technique, the control-point grid is imposed on the model and control points on the grid are moved by a system-designer to specify a deformation to a particular region of the model. Specifically, displacement or movement of one or more control points on the grid allows the designer to impart the desired deformation on the specified region of the geometric model.

Figure 1:
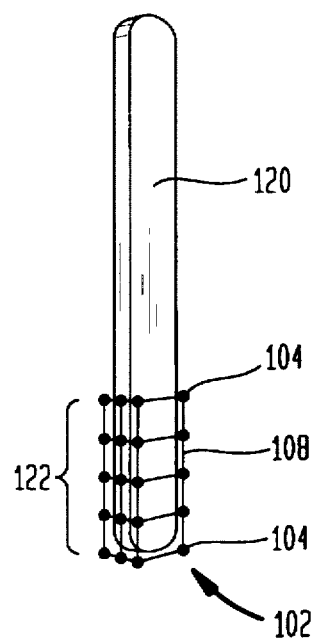
FIG. 1 is a diagram illustrating a deformation lattice for the deformation of a region of a geometric model using free-form deformation techniques.
Figure 2:
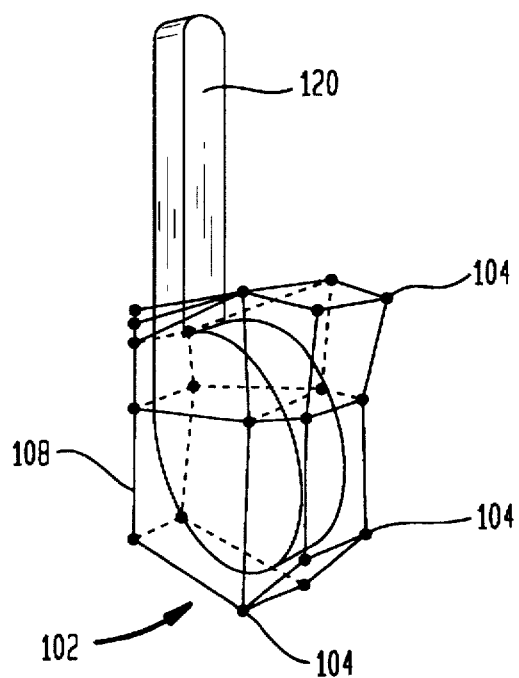
FIG. 2 illustrates an example of a deformation of a region caused by the displacement of a plurality of corner points relative to other corner points which are held stationary on the lattice.

This concept of free-form deformation is now described with reference to FIGS. 1 and 2. FIGS. 1 and 2 illustrate the deformation of a region of a geometric model using basic free-form deformation techniques. According to the example illustrated in FIG. 1, a geometric bar 120 is to be deformed. More specifically, a specific region 122 of bar 120 is to be deformed. The geometric bar can be defined as a surface made up of a plurality of points called vertices.

To accomplish the desired deformation using free-form deformation techniques, a control point grid (referred to as lattice 102) is provided around region 122. The lattice 102 is defined by a plurality of corner points 104 connected by edges 108. Note that in this FIG. 1, as well as in subsequent illustrations, not all the points 104 and edges are labelled with reference numbers. This is done to avoid unnecessary clutter in the drawings.

To deform region 122 of bar 120, the designer repositions, or displaces, one or more of the corner points 104. The displacement of a corner point results in the consequential displacement of a one or more vertices that make up region 122. The actual deformation caused to region 122 is affected by the proximity of region 122 to a displaced corner point 104. Specifically, according to conventional free-form deformation, the displacement of any given vertex in region 122 is a function of the three-dimensional distance of that vertex from a displaced node 104. The further a point is from the displaced node, the less the displacement is imparted on that point.

FIG. 2 illustrates an example of a deformation of region 122 caused by the displacement of a plurality of corner points 104 relative to other corner points 104 which are held stationary on the grid. The manner on which free-form deformation is accomplished using a CPU or other processing system, is fully described in U.S. Pat. No. 4,821,214 to Sederberg, which is incorporated herein by reference. Free-form deformation is further described in "Free-Form Deformation of Solid Geometric Models," *Proceedings of SIGGRAPH 86, Computer Graphics*, Volume 20, No. 4, August 1986, pp. 151–160; and Foley, James D., et al., *Computer Graphics: Principles and Practice*, Second Edition, Addition-Wesley, 1990 with corrections 1992 and 1993, pp. 1014–1054, which are also incorporated herein by reference.

3. Delta Free-Form Deformation

Although free-form deformation is an important tool in computer-assisted geometric design and animation, delta free-form deformation is specifically designed for deforming objects that are also being transformed by an underlying skeleton. For example, consider the field of character animation. When animating a character, a three-dimensional geometric model of the character is made. To ensure realism, the characters can be animated by modeling the character as a skeleton surrounded by a skin. As the skeleton moves, it displaces and deforms the skin around it. Because each vertex that makes up the skin is attached to a segment of the skeleton, when the segment moves the skin vertex moves. Unfortunately, this simple concept does not provide realism by itself as it does not allow for smooth bands at the joints or bulging of muscles as the skeleton moves. These effects, however, can be created using some type of free-form deformation.

Unfortunately, the application of conventional free-form deformation techniques results in conflicts between vertex transformations provided by translation of the skeletal segments and transformations provided by free-form deformation. Because of this conflict, using conventional free-form deformation techniques, each vertex could only be controlled by either a segment or a free-form deformation grid, but not by both. Additionally, free-form deformation grids themselves could not overlap because the first free-form deformation could theoretically transform a vertex of the object completely outside of an overlapping free-form deformation grid that is also deforming that vertex.

To overcome these limitations, the delta free-form deformation was developed by the inventors. The delta free-form deformation does not transform the vertex as was done using conventional free-form deformation. Instead, the output of the delta free-form deformation is a list of vectors (or translation deltas), one per vertex. The delta is an indication of the amount that vertex would have moved under a normal free-form deformation displacement. Where multiple free-form deformations and/or skeletal translations are to take place, each delta free-form deformation is applied to the affected vertices and all of the delta vectors for a given vertex are summed, resulting in a total deformation for each vertex. Thus, in summary, according to delta free-form deformation, each movement of a vertex is described in terms of a vector and all the vectors for each vertex are summed to reflect the net movement of each vertex.

Delta free-form deformations are fully described in co-pending U.S. patent application entitled "System and Method for Deforming Objects Using Delta Free-Form Deformation Techniques" of common assignee, Attorney Docket No. 1452.1540000, U.S. patent application Ser. No. 08/512,136, filed on even date herewith, the full disclosure of which is incorporated herein by reference.

4. Volume-Based Free-Form Deformation Weighting

To improve the smoothness of deformations created using free-form deformation techniques such as those described above in Sections 2 and 3 of this document, the inventors developed volume-based free-form deformation. Volume-based free-form deformation weighting is a method of calculating a weight for one or more vertices embedded within a region modified by free-form deformation. The calculated weight is based on the geometric location of the vertex within that deformation region. The invention further provides a method for using the calculated weight to control the amount of influence that a delta free-form deformation has on that vertex.

It should be noted that the term "free-form deformation" as used throughout this document generally refers to not only the specific type of free-form deformation described in Section 2 above, but also refers to delta free-form deformation described in Section 3 as well as other types of free-form deformation.

Volume-based free-form deformation weighting is a method of defining and storing the influence that a free-form deformation lattice has on vertices within that lattice. Volume-based free-form deformation weighting takes advantage of features of free-form deformation. Specifically, volume-based free-form deformation weighting takes advantage of the fact that a large and easy to manipulate grid (e.g., a parallelipiped lattice) can be used to manipulate a complicated object within the confines of the lattice, and that each geometry vertex of the object region inside the lattice is assigned a local coordinate value based on that vertex's geometric location within the non-deformed lattice.

In this document, the weights assigned to the vertices are described in terms of weights ranging from 0%–100%. Using this convention, a vertex having an assigned weight of 0% is not moved by the deformation, while a vertex having an assigned weight of 100% is translated by the full amount specified by the deformation. It should be understood that other conventions could be adopted for defining the weights in terms other than percentages.

Figure 3:
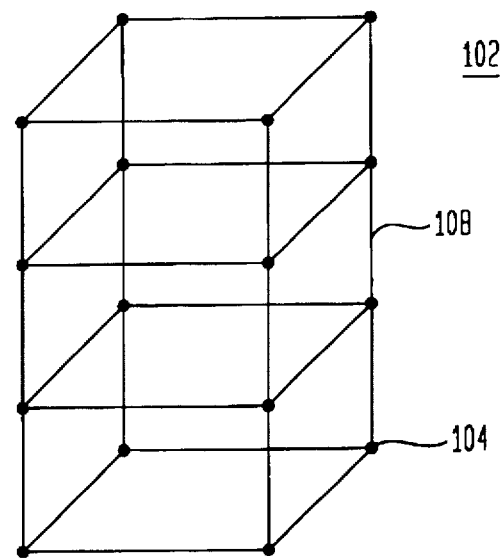
FIG. 3 is a diagram illustrating a simple lattice that can be used to define deformation.
Figure 4:
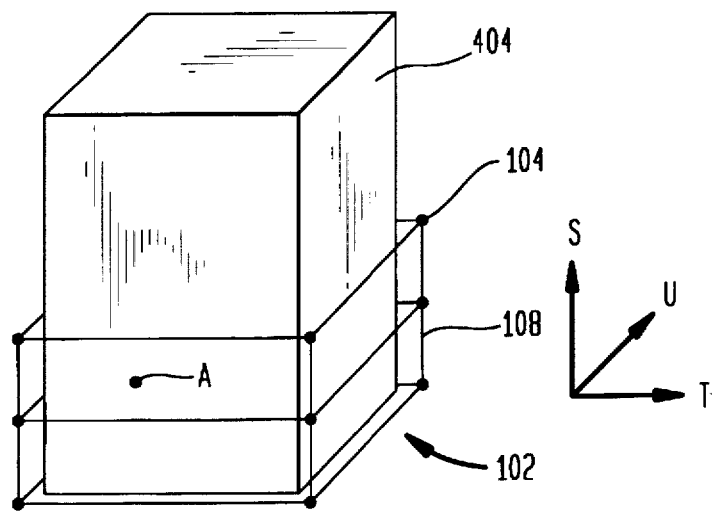
FIG. 4 is a diagram illustrating a simple example of a block that is to be deformed using a deformation lattice.

FIG. 3 is a diagram illustrating a simple lattice 102 that can be used to define a deformation. Referring to FIG. 3, lattice 102 is defined by corner points 104 and edges 108 between corner points 104. The lattice 102 depicted in FIG. 3 is a six-sided three-dimensional lattice having twelve corner points 104. An object (e.g., object 120) positioned within lattice 102 can be deformed by displacing one or more corner points 104 from their original positions. Each vertex or point on the object within lattice 104 (or a region of the object within lattice 104) is defined by its geometric position within lattice 102. To illustrate this concept further, consider the example illustrated in FIG. 4. In FIG. 4, an object 404, a simple block in this example, is within lattice 408. A point A on the surface, or skin, of block 404 is within lattice 408. The geometric location of point A within lattice 408 is defined in terms of its local (S,T,U) position in lattice 408, where S, T, and U are the axes defined by the coordinate system 422.

As discussed above, deformation of block 404 can be accomplished by displacing one or more corner points 104 to obtain a desired deformation. However, the use of conventional free-form deformation, and even delta free-form deformation, provides limitations in the deformation which can be performed. The use of volume-based free-form deformation weighting allows a user of a graphics system to easily and intuitively control the region of influence during a free-form deformation.

Figure 5:
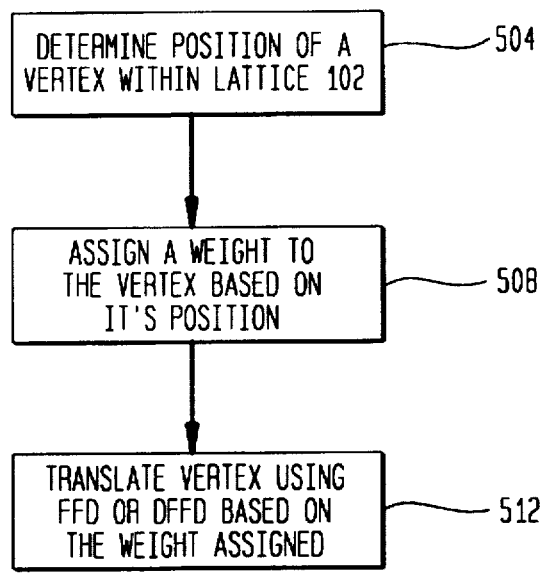
FIG. 5 is an operational flow diagram illustrating a method by which volume-based free-form deformation weighting is performed according to one embodiment of the invention.

FIG. 5 is an operational flow diagram illustrating a method by which volume-based free-form deformation weighting is performed according to one embodiment of the invention. Referring now to FIG. 5, in a step 504, the position of a vertex within lattice 102 is determined. For the example illustrated in FIG. 4, the position of vertex A is determined in terms of its local (S,T,U) position within lattice 408.

In a step 508, a weight is assigned to the vertex based on the position determined in step 504. And finally, in step 512, the vertex is moved using free-form deformation or delta free-form deformation as adjusted by the weight assigned to that vertex in step 508.

For a vertex assigned a full weight (referred to as 100%), the vertex is translated the full amount specified by the free-form deformation. A vertex with a weighting of less than 100% moves by an amount that is specified by the free-form deformation, but only by an amount for the deformation that is proportional to the percentage of weight assigned. For example, a vertex having a weight of 50%, will move only half of the amount specified by the free-form deformation or delta free-form deformation. Similarly, a vertex with zero weighting will not move regardless of the movement specified by the free-form deformation or delta free-form deformation.

As stated above, the use of a weighting assignment to vertices within a region can be used to change a region of influence of the lattice. This is best illustrated by way of example. Consider the following example where the weighting assignment of various weights to particular vertices changes the region of influence of the lattice 102 from that of a parallelipiped to that of a sphere having a reference radius R1. In this example, the lattice is a cube having eight corner points 104, and edge lengths of one. The center of the lattice 102 is the reference point (0.5,0.5,0.5). Each vertex is considered to have a radius, R, that is a function of that vertex's (S,T,U) position relative to the reference point, where the radius, R, is defined as:

$$R = \sqrt{(S-0.5)^2 + (T-0.5)^2 + (U-0.5)^2}$$

For vertices where the radius is less than or equal to R1 (the radius of the sphere), the weighting of each such vertex is 100%. On the other hand, where the radius of a vertex is found to be greater than R1, the weighting assigned to that vertex is 0%.

As a result, when the weighting determined for each vertex is applied to the amount of displacement determined in the free-form deformation or delta free-form deformation, the actual displacement of that vertex is affected by the weighting. Because, in this example, the weighting is either 100%, or 0%, the vertex is either 100% affected by the deformation or completely unaffected by the deformation. Specifically, in this example, only those vertices within the radius R1 of the sphere are affected by the deformation while all those vertices outside of the defined sphere of radius R1 are not affected at all by the deformation.

Thus, the use of such volume-based weighting is a powerful tool for controlling the region of influence that a deformation will have on an object. As was illustrated by the above example, the region of influence of a deformation can be changed from the conventional deformation in which the region was defined by the lattice (i.e., the original parallelipiped) to that in which the region of influence is defined as a sphere. Note that changes in the region of influence within the lattice 102 are not limited to the definition of a sphere as described in the above example. Other weighting schemes can be implemented to provide alternative definitions for the region of influence.

Figure 6:
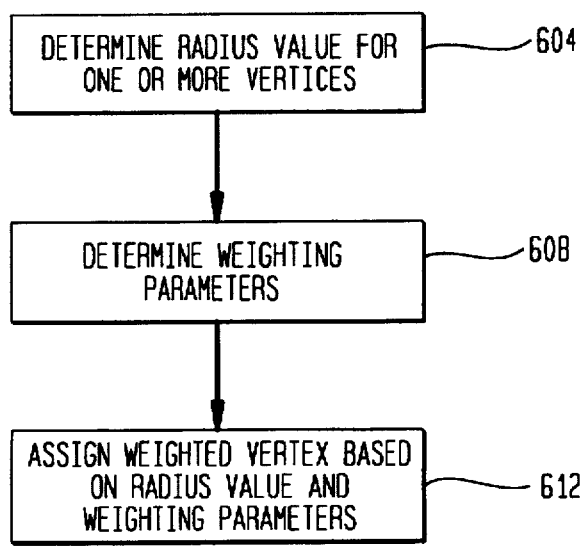
FIG. 6 is a flow diagram illustrating how vertex weights are determined according to one embodiment of the invention.

Although the manner in which such volume-based weighting is accomplished is generally described by the flow diagram of FIG. 5, more specific control of the influence of the deformation can be accomplished. FIG. 6 is a flow diagram illustrating how the weights are determined according to one embodiment of the invention. According to this embodiment, in a step 604, a radius value for one or more of the vertices is determined. In one embodiment, the radius value for each vertex can range from 0.0 to 1.0. The radius value is used in conjunction with weighting parameters to determine the weight assigned to each vertex.

In a step 608, the weighting parameters are determined. The weighting parameters allow either a default setting of 100% (i.e., no weighting effect on the vertices), or can be set to adjust the weight assigned to each vertex. This is accomplished in a step 612 where the weighting parameters are applied to the radius value to obtain a weight for each of the one or more vertices. Each of these steps is described below in detail.

The step of determining radius values for the vertices affected by lattice 102 is now described. According to one embodiment, there are two parameters that are used in conjunction with radius value determination. These are termed a weight setting and a corner type. In one embodiment, these parameters can be adjusted or selected by the user to control the manner in which radius values are assigned to the vertices. Each of these parameters is now described.

The weight setting parameters are defined for the corner points 104. In one embodiment, the weight settings can be set individually for each corner point 104. In this embodiment, each corner point 104 can have its own unique weight type, weight, and radius values.

Alternatively, the weight settings can be assigned such that the weight settings are the same for each corner point 104 along one of the S, T, and U axes. For example, if the weight setting is selected such that the weight settings are the same along the S axis, when one corner point 104 is assigned a particular weight setting, the other corner points 104 along the S axis are automatically set to match the weight settings for the original corner point 104 selected.

In yet another alternative, when one corner point 104 is adjusted by the user, the weight settings of all the other corner points 104 in lattice 102 are set to match the adjusted corner point 104. In this alternative, all corner points 104 in the lattice 102 are maintained at the same weight setting.

A second parameter that can be specified to control the radius value determination for the vertices is the corner type. The corner type specifies how the weight values are applied to the vertices within the lattice. When a default corner type setting is selected, the weighting value assigned to each affected vertex is 100%. In other words, the default corner type setting results in a lattice 102 that behaves as a standard deformation lattice 102 without the effects of volume-based weighting. When a setting other than a default setting is chosen for the corner type for a corner point 104, a radius value is determined for vertices affected by that corner point 104.

One non-default corner type setting can be defined as being banded in a given plane. For example, the corner type can be defined as being banded by a reference plane such as the ST plane, that is, a plane defined by the S and T axes. A banded corner type is now described in terms of banding in the ST plane although after reading the following description it will become apparent to a person skilled in the relevant art how banding applies equally well to the TU and US planes. When the lattice 162 is banded in the ST plane, the weighting is applied according to the distance of the vertex from the ST plane. Radius values are measured along the U axis and a radius value of 0.0 refers to points along a plane parallel to the ST plane that intersects the center of the lattice 102. A radius value of 1.0 refers to the face of lattice 102 parallel to the ST plane nearest the selected corners.

Figure 7:
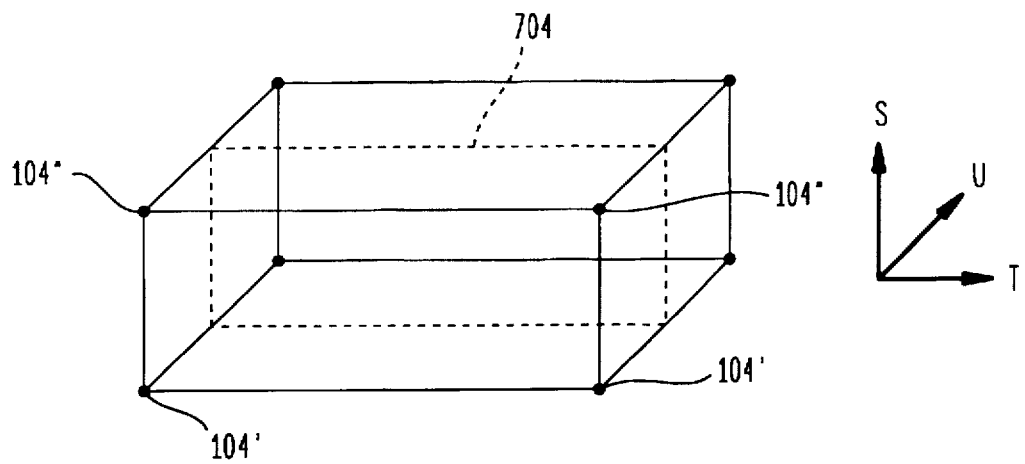
FIG. 7 is a diagram illustrating a corner type defined as banded in the ST plane within a lattice.

FIG. 7 is a diagram illustrating a corner type defined as banded in the ST plane within a lattice 102. In this example, the corners selected for banding in the ST plane are corner points 104'. Points on the plane defined by corner points 104" and 104' have a radius value of 1.0. This is the ST plane that is nearest to the selected corner points 102. Points along plane 704 as illustrated by the dashed line have a radius value of 0.0. The plane 704 intersects the center of lattice 102.

Another corner type that can be defined is a RADIAL FROM CENTER corner type. When the corner type is defined as being a RADIAL FROM CENTER corner type, the weighting of a vertex is performed according to the distance of the vertex from the center of lattice 102. A radius value of 0.0 refers to any vertices located at the center of the lattice 102. A radius value of 1.0 refers to vertices along any of the faces of lattice 102. Note that in most applications, the vertex points usually lie near the border of lattice 102 and, therefore, the radius values usually vary only slightly between 0.9 and 1.0.

Another corner type that can be defined is a RADIAL FROM CORNER corner type. A RADIAL FROM CORNER corner type varies the weighting according to the distance of the vertex from a selected corner point 104 (i.e., from a selected corner for an 8-point lattice) of lattice 102. A radius value of 0.0 refers to any vertices located at the selected corner point 104 (selected corner). A radius value of 1.0 refers to vertices at the inner faces of the selected corner point's octant.

Another corner type is defined as a RADIAL FROM MIDPOINT corner type. This is a radial corner type from the midpoint of the S, T, or U axis. With this RADIAL FROM MIDPOINT corner type, the radius value for each vertex varies according to the distance of the vertex from the selected axis. For example, if the corner type is defined as being radial from the midpoint of the S axis, the radius value of a vertex varies according to the distance of that vertex from the S axis midpoint of the edge 108 attached to the selected corner point 104.

Figure 8:
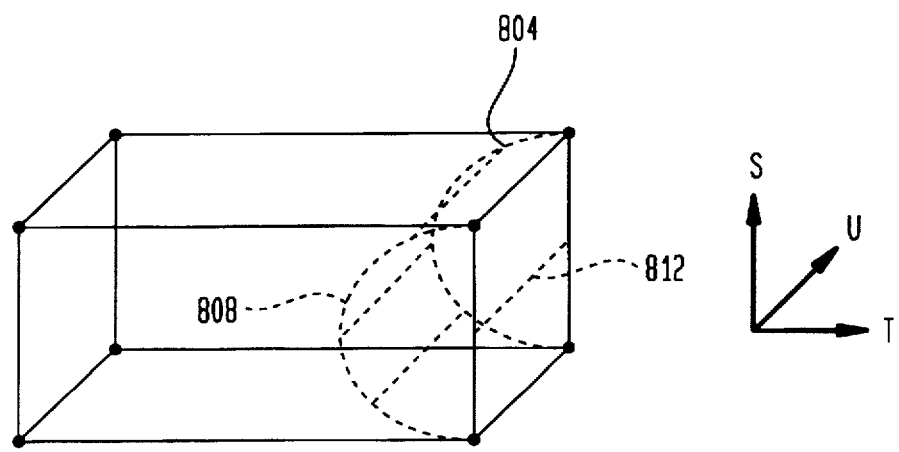
FIG. 8 is a diagram illustrating radius values where the corner type is set to RADIAL FROM MIDPOINT of the S axis and the weight setting is set to be uniform along the U axis.

FIG. 8 is a diagram illustrating radius values where the corner type is set to RADIAL FROM MIDPOINT of the S axis and the weight setting is set to be uniform along the U axis. For simplicity, the lattice 102 illustrated in FIG. 8 is an eight-point lattice. According to these parameters, points along the surface defined by dashed lines 804 and 808 each have a value of 1.0, while points along the edge defined by dashed line 812 (i.e., the edge 108 attached to the selected corner point 104) each have a weighting of 0.0.

Figure 9:
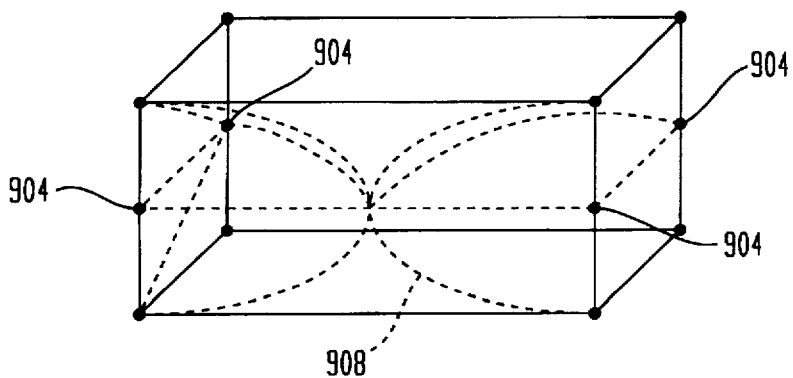
FIG. 9 is a diagram illustrating radius values where the corner type is defined as RADIAL FROM MIDPOINT for the S axis and the weight setting is selected such that the weight settings are set equally at all corner points of the lattice.

FIG. 9 is a diagram illustrating radius values where the corner type is defined as RADIAL FROM MIDPOINT for the S axis and the weight setting is selected such that the weight settings are set equally at all corner points 104 of lattice 102. According to these parameters, vertices at the locations 904 have an assigned radius value of 0.0, while vertices along the outer surface of the spheres defined by dashed lines 908 have a radius value of 1.0.

The above discussion describes how radius values are computed for vertices within the lattice 102 based on the weight setting and corner type parameters. As described, variation of these parameters affects the radius values assigned to the vertices.

To determine how the radius value is mapped into a weight for each vertex, one or more of a plurality of weight parameters can be used. In a preferred embodiment, there are four weight parameters: WEIGHT IN, WEIGHT OUT, RADIUS IN and RADIUS OUT.

Figure 10:
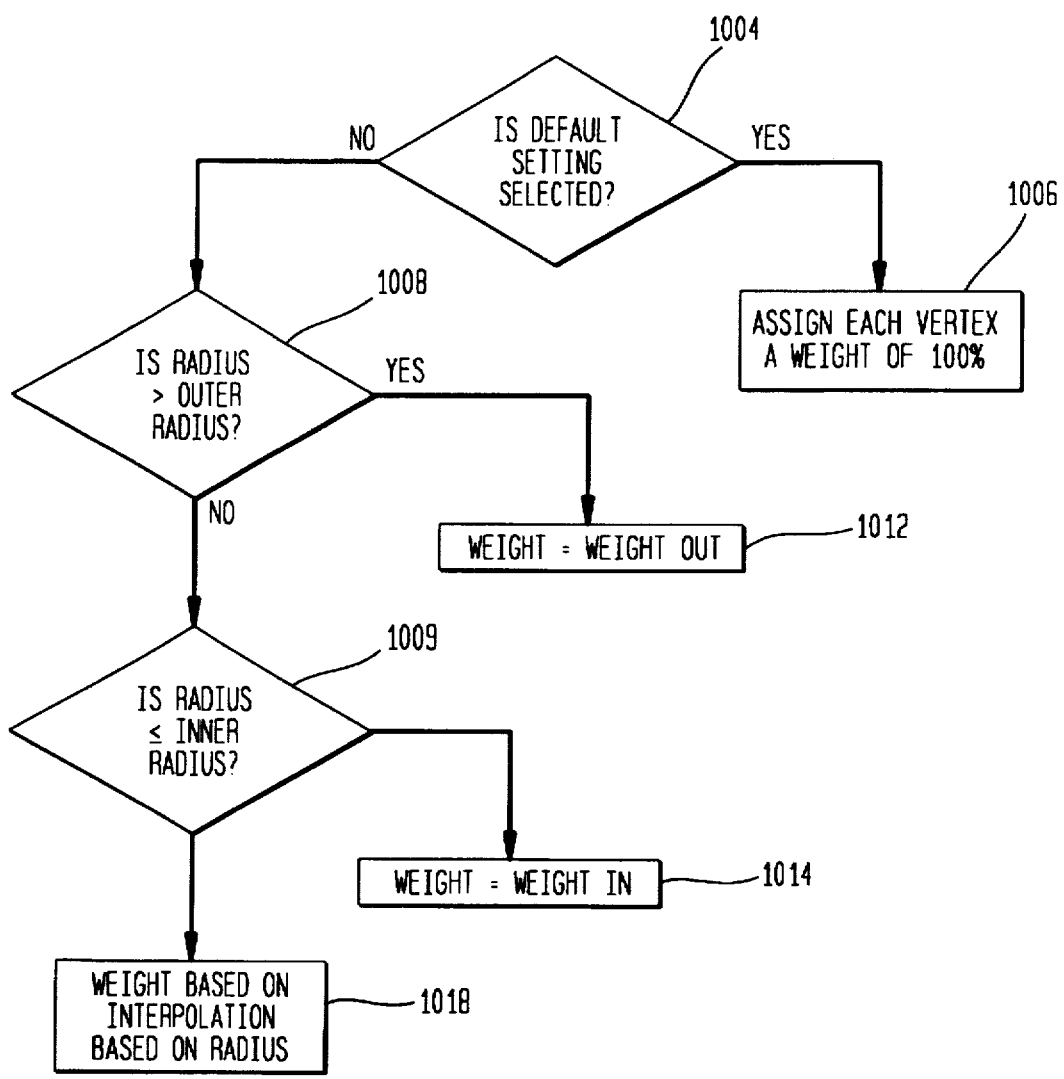
FIG. 10 is a flow diagram illustrating the manner in which WEIGHT IN and WEIGHT OUT values are used to determine vertex weights.

When a default setting for WEIGHT IN and WEIGHT OUT is selected, the radius value has no impact on the weighting of the vertices, and each vertex is assigned a weight of 100%. According to one embodiment, this default setting is selected where the user enters a WEIGHT IN of 100 and a WEIGHT OUT of 100.

Where a setting other than the default setting is chosen, the user selects a WEIGHT IN and/or a WEIGHT OUT value. These values are then applied to determine the vertex weights. FIG. 10 is a flow diagram illustrating the manner in which WEIGHT IN and WEIGHT OUT values are used to determine vertex weights.

In a step 1004, it is determined whether the default setting for the WEIGHT IN and WEIGHT OUT parameters has been selected. If the default setting is selected, in a step 1006, each vertex is assigned a weight of 100%. If, on the other hand, default settings for WEIGHT IN and WEIGHT OUT are not chosen, the parameters affect the weight of the affected vertices. In this case, the operation continues at step 1008.

In steps 1008 and 1009, for each vertex, it is determined whether the radius of that vertex is greater than the outer reference radius, less than or equal to the inner reference radius, or somewhere in between.

Where the radius of a vertex is greater than the outer radius, in a step 1012, that vertex is assigned a weight equal to the WEIGHT OUT value.

Where the radius of the vertex is less than or equal to the inner radius, in a step 1014, the WEIGHT IN value is used as the weight for that vertex.

Where the radius of the vertex is greater than the inner radius and still less than or equal to the outer radius, in a step 1018, a linear interpolation between the WEIGHT IN and the WEIGHT OUT value based on the radius of the vertex is used to determine the weight of that vertex.

The other two parameters, RADIUS IN and RADIUS OUT, can be used in conjunction with the WEIGHT IN and WEIGHT OUT parameters and the radius value to further define the weights assigned to the vertices.

When RADIUS IN and RADIUS OUT are set to a default value, they are not used, and hence, have no effect on the weighting. In one embodiment, the default setting for the RADIUS IN and RADIUS OUT parameters is selected when both the RADIUS IN and the RADIUS OUT are set to 0.0.

On the other hand, where values other than 0.0 are provided for RADIUS IN and RADIUS OUT, these parameters impact the weighting assignment. In a preferred embodiment, RADIUS IN and RADIUS OUT can each be assigned a value from 0.0 to 1.0. Where RADIUS IN is equal to .X, and X does not equal zero, for vertices between a radius of zero and a radius of .X, the weight is equal to the value of the parameter WEIGHT IN. Where Radius Out is equal to .Y, and Y does not equal zero, for vertices between a radius of 1.0 and a radius of .Y, the weight is equal to the value of the parameter WEIGHT OUT.

Figure 11:
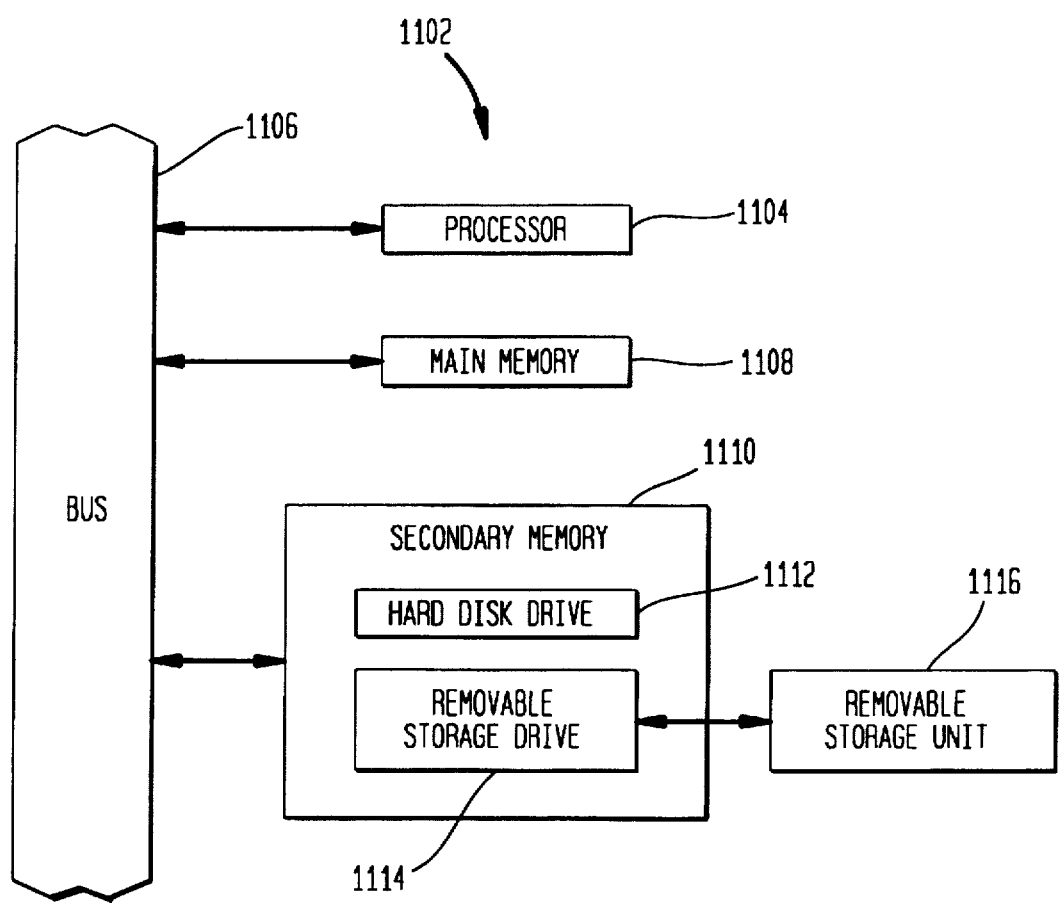
FIG. 11 is a block diagram illustrating an example embodiment of a computer system that can be used to execute the functionality of the invention.

In one embodiment, the invention is directed to a computer system or a graphics processing system operating as discussed herein. An exemplary computer system 1102 is shown in FIG. 11. The computer system 1102 includes one or more processors, such as processor 1104. The processor 1104 is connected to a communication bus 1106.

The computer system 1102 also includes a main memory 1108, preferably random access memory (RAM), and a secondary memory 1110. The secondary memory 1110 includes, for example, a hard disk drive 1112 and/or a removable storage drive 1114, representing a floppy disk drive, a magnetic tape drive, a compact disk drive, etc. The removable storage drive 1114 reads from and/or writes to a removable storage unit 1118 in a well known manner.

Removable storage unit 1118, also called a program storage device or a computer program product, represents a floppy disk, magnetic tape, compact disk, etc. As will be appreciated, the removable storage unit 1118 includes a computer usable storage medium having stored therein computer software and/or data.

Computer programs (also called computer control logic) are stored in main memory and/or the secondary memory 1110. Such computer programs, when executed, enable the computer system 1102 to perform the features of the present invention as discussed herein. In particular, the computer programs, when executed, enable the processor 1104 to perform the features of the present invention. Accordingly, such computer programs represent controllers of the computer system 1102.

In another embodiment, the invention is directed to a computer program product comprising a computer readable medium having control logic (computer software) stored therein. The control logic, when executed by the processor 1104, causes the processor 1104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

3. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for using a free form deformation technique to deform a region of an object, the region of the object defined by a plurality of vertices, the free form deformation technique employing a control grid, the method comprising the steps of:

determining a position of each of the plurality of vertices with respect to a predetermined reference;

assigning a weight to each of the plurality of vertices based on said position of each of the plurality of vertices;

deforming the plurality of vertices using the free form deformation technique and the control grid resulting in a plurality of deformed vertices, wherein said deforming step includes the step of controlling an amount of influence said free form deformation has on each of the plurality of vertices based on said weight assigned to each of the plurality of vertices; and displaying the plurality of deformed vertices, thereby displaying the deformed region of the object.

2. The method of claim 1, wherein said step of assigning a weight comprises the steps of:

determining a radius value for each of the plurality of vertices; and assigning a weight to each of the plurality of vertices based on said radius value of each of the plurality of vertices.

3. The method of claim 1, wherein said step of assigning a weight comprises the steps of:

determining a radius value for each of the plurality of vertices;

determining a weighting parameter for each of the plurality of vertices; and assigning a weight to each of the plurality of vertices based on said radius value and said weighting parameter of each of the plurality of vertices.

4. The method of claim 1, wherein said determining a position step comprises the step of determining a position of each of the plurality of vertices with respect to a predetermined reference point.

5. The method of claim 1, wherein said determining a position step comprises the step of determining a position of each of the plurality of vertices with respect to a predetermined reference plane.

6. The method of claim 1, wherein said determining a position step comprises the step of determining a position of each of the plurality of vertices with respect to a predetermined sphere with a reference radius.

7. The method of claim 3, wherein said step of determining a weighting parameter comprises the steps of:

selecting a WEIGHT OUT value;

determining whether said radius value for each of the plurality of vertices is greater than an outer radius; and assigning a weight equal to said WEIGHT OUT value to each of the plurality of vertices that has said radius value greater than said outer radius.

8. The method of claim 3, wherein said step of determining a weighting parameter comprises the steps of:

selecting a WEIGHT IN value;

determining whether said radius value for each of the plurality of vertices is less than an inner radius; and assigning a weight equal to said WEIGHT IN value to each of the plurality of vertices, that has said radius value less than said inner radius.

9. The method of claim 3, wherein said step of determining a weighting parameter comprises the steps of:

selecting a WEIGHT IN value;

selecting a WEIGHT OUT value;

determining whether said radius value for each of the plurality of vertices is greater than an outer radius;

determining whether said radius for each of the plurality of vertices is less than an inner radius; and assigning a weight based on an interpolation between said WEIGHT IN and WEIGHT OUT values to each of the plurality of vertices that has said radius value that is not less than said inner radius and not greater than said outer radius.

10. A system for using a free form deformation technique to deform a region of an object, the region of the object defined by a plurality of vertices, the free form deformation technique employing a control grid, the system comprising:

means for determining a position of each of the plurality of vertices with respect to a predetermined reference;

means for assigning a weight to each of the plurality of vertices based on said position of each of the plurality of vertices;

means for deforming the plurality of vertices using the free form deformation technique and the control grid resulting in a plurality of deformed vertices, wherein said means for deforming includes means for controlling an amount of influence said free form deformation has on each of the plurality of vertices based on said weight assigned to each of the plurality of vertices; and means for displaying the plurality of deformed vertices, thereby displaying the deformed region of the object.

11. The system of claim 10, wherein said means for assigning a weight comprises:

means for determining a radius value for each of the plurality of vertices; and means for assigning a weight to each of the plurality of vertices based on said radius value of each of the plurality of vertices.

12. The system of claim 10, wherein said means for assigning a weight comprises:

means for determining a radius value for each of the plurality of vertices;

means determining a weighting parameter for each of the plurality of vertices; and means for assigning a weight to each of the plurality of vertices based on said radius value and said weighting parameter of each of the plurality of vertices.

13. The system of claim 12, wherein said means for determining parameter comprises:

means for selecting a WEIGHT OUT value;

means for determining whether said radius value for each of the plurality of vertices is greater than an outer radius; and means for assigning a weight equal to said WEIGHT OUT value to each of the plurality of vertices that has said radius value greater than said outer radius.

14. The system of claim 12, wherein said means for determining a weighting parameter comprises:

means for selecting a WEIGHT IN value;

means for determining whether said radius value for each of the plurality of vertices is less than an inner radius; and means for assigning a weight equal to said WEIGHT IN value to each of the plurality of vertices that has said radius value less than said inner radius.

15. The system of claim 12, wherein said means for determining a weighting parameter comprises:

means for selecting a WEIGHT IN value;

means for selecting a WEIGHT OUT value;

means for determining whether said radius value for each of the plurality of vertices is greater than an outer radius;

means for determining whether said radius for each of the plurality of vertices is less than an inner radius; and means for assigning a weight based on an interpolation between said WEIGHT IN and WEIGHT OUT values to each of the plurality of vertices that has said radius value that is not less than said inner radius and not greater than said outer radius.

16. A program storage device readable by a machine, tangibly embodying a program of instructions executable by the machine to perform method steps for using a free form deformation technique to deform a region of an object, the region of the object defined by a plurality of vertices, the free form deformation technique employing a control grid, the method comprising the steps of:

determining a position of each of the plurality of vertices with respect to a predetermined reference;

assigning a weight to each of the plurality of vertices based on said position of each of the plurality of vertices;

deforming the plurality of vertices using the free form deformation technique and the control grid resulting in a plurality of deformed vertices, wherein said deforming step includes the step of controlling an amount of influence said free form deformation has on each of the plurality of vertices based on said weight assigned to each of the plurality of vertices; and displaying the plurality of deformed vertices, thereby displaying the deformed region of the object.

17. The program storage device of claim 16, wherein said step of assigning a weight comprises the steps of:

determining a radius value for each of the plurality of vertices; and assigning a weight to each of the plurality of vertices based on said radius value of each of the plurality of vertices.

18. The program storage device of claim 16, wherein said step of assigning a weight comprises the steps of:

determining a radius value for each of the plurality of vertices;

determining a weighting parameter for each of the plurality of vertices; and assigning a weight to each of the plurality of vertices based on said radius value and said weighting parameter of each of the plurality of vertices.

19. The program storage device of claim 18, wherein said step of determining a weighting parameter comprises the steps of:

selecting a WEIGHT OUT value;

determining whether said radius value for each of the plurality of vertices is greater than an outer radius; and assigning a weight equal to said WEIGHT OUT value to each of the plurality of vertices that has said radius value greater than said outer radius.

20. The program storage device of claim 18, wherein said step of determining a weighting parameter comprises the steps of:

selecting a WEIGHT IN value;

determining whether said radius value for each of the plurality of vertices is less than an inner radius; and assigning a weight equal to said WEIGHT IN value to each of the plurality of vertices that has said radius value less than said inner radius.

21. The program storage device of claim 18, wherein said step of determining a weighting parameter comprises the steps of:

selecting a WEIGHT IN value;

selecting a WEIGHT OUT value;

determining whether said radius value for each of the plurality of vertices is greater than an outer radius;

determining whether said radius for each of the plurality of vertices is less than an inner radius; and assigning a weight based on an interpolation between said WEIGHT IN and WEIGHT OUT values to each of the plurality of vertices that has said radius value that is not less than said inner radius and not greater than said outer radius.

22. A computer program product for use with a computer comprising a computer useable medium having computer program logic for using a free form deformation technique to deform a region of an object, the region of the object defined by a plurality of vertices, the free form deformation technique employing a control grid, said computer program logic comprising:

computer readable program code means for causing the computer to determine a position of each of the plurality of vertices with respect to a predetermined reference;

computer readable program code means for causing the computer to assign a weight to each of the plurality of vertices based on said position of each of the plurality of vertices;

computer readable program code means for causing the computer to deform the plurality of vertices using the free form deformation technique and the control grid resulting in a plurality of deformed vertices, wherein said computer readable program code means for causing the computer to deform includes computer readable program code means for causing the computer to control an amount of influence said free form deformation has on each of the plurality of vertices based on said weight assigned to each of the plurality of deformed vertices; and computer readable program code means for causing the computer to display the plurality of vertices, thereby displaying the deformed region of the object.

23. The computer program product of claim 22, wherein said computer readable program code means for assigning a weight comprises:

computer readable program code means for causing the computer to determine a radius value for each of the plurality of vertices; and computer readable program code means for causing the computer to assign a weight to each of the plurality of vertices based on said radius value of each of the plurality of vertices.

24. The computer program product of claim 22, wherein said computer readable program code means for causing the computer to assign a weight comprises:

computer readable program code means for causing the computer to determine a radius value for each of the plurality of vertices;

computer readable program code means for causing the computer to determine a weighting parameter for each of the plurality of vertices; and computer readable program code means for causing the computer to assign a weight to each of the plurality of vertices based on said radius value and said weighting parameter of each of the plurality of vertices.

25. The computer program product of claim 23, wherein said computer readable program code means for determining a weighting parameter comprises:

computer readable program code means for causing the computer to select a WEIGHT OUT value;

computer readable program code means for causing the computer to determine whether said radius value for each of the plurality of vertices is greater than an outer radius; and computer readable program code means for causing the computer to assign a weight equal to said WEIGHT OUT value to each of the plurality of vertices that has said radius value greater than said outer radius.

26. The computer program product of claim 23, wherein said computer readable program code means for determining a weighting parameter comprises:

computer readable program code means for causing the computer to select a WEIGHT IN value;

computer readable program code means for causing the computer to determine whether said radius value for each of the plurality of vertices is less than an inner radius; and computer readable program code means for causing the computer to assign a weight equal to said WEIGHT IN value to each of the plurality of vertices that has said radius value less than said inner radius.

27. The computer program product of claim 23, wherein said computer readable program code means for determining a weighting parameter comprises:

computer readable program code means for causing the computer to select a WEIGHT IN value;

computer readable program code means for causing the computer to select a WEIGHT OUT value;

computer readable program code means for causing the computer to determine whether said radius value for each of the plurality of vertices is greater than an outer radius;

computer readable program code means for causing the computer to determine whether said radius for each of the plurality of vertices is less than an inner radius; and computer readable program code means for causing the computer to assign a weight based on an interpolation between said WEIGHT IN and WEIGHT OUT values to each of the plurality of vertices that has said radius value that is not less than said inner radius and not greater than said said outer radius.

* * * * *